United States Patent
Zellner et al.

(10) Patent No.: US 7,707,499 B2
(45) Date of Patent: Apr. 27, 2010

(54) METHODS, SYSTEMS, AND STORAGE MEDIUMS FOR OPTIMIZING A DEVICE

(75) Inventors: Samuel Zellner, Dunwoody, GA (US); Steven Tischer, Atlanta, GA (US)

(73) Assignee: AT&T Intellectual Property, I.L.P., Reno, NV (US)

( * ) Notice: Subject to any disclaimer, the term of this patent is extended or adjusted under 35 U.S.C. 154(b) by 1472 days.

(21) Appl. No.: 10/837,863

(22) Filed: May 3, 2004

(65) Prior Publication Data
US 2005/0246639 A1 Nov. 3, 2005

(51) Int. Cl.
*G06F 3/00* (2006.01)

(52) U.S. Cl. .................................. 715/708

(58) Field of Classification Search ......... 715/705–709, 715/741–745, 751, 762
See application file for complete search history.

(56) References Cited

U.S. PATENT DOCUMENTS

| | | | |
|---|---|---|---|
| 5,859,640 A * | 1/1999 | de Judicibus | 715/710 |
| 6,170,065 B1 * | 1/2001 | Kobata et al. | 714/7 |
| 6,338,149 B1 * | 1/2002 | Ciccone et al. | 714/38 |
| 7,251,724 B2 * | 7/2007 | Kobayashi et al. | 713/1 |
| 7,437,659 B2 * | 10/2008 | Taniwaki et al. | 715/200 |
| 2002/0042815 A1 * | 4/2002 | Salzfass et al. | 709/206 |
| 2002/0118223 A1 * | 8/2002 | Steichen et al. | 345/745 |
| 2003/0002074 A1 * | 1/2003 | Miyano | 358/1.15 |
| 2003/0229691 A1 * | 12/2003 | Ishimoto | 709/223 |
| 2004/0153971 A1 * | 8/2004 | Taniwaki et al. | 715/530 |

* cited by examiner

*Primary Examiner*—Ryan F Pitaro
(74) *Attorney, Agent, or Firm*—Cantor Colburn LLP

(57) ABSTRACT

Exemplary embodiments of the invention include methods, systems, and storage mediums for optimizing a device. The method includes detecting a suboptimal condition associated with the device and analyzing the suboptimal condition in light of selected operator preferences and device-related data. In response to the analysis, the method includes modifying a configuration of the device, the current state of said device, a current state of a networked device associated with said device, or a configuration of a networked device associated with said device. Alternatively, in response to the analyzing, the method includes notifying the operator of the suboptimal condition. The selected operator preferences include at least one of personality settings, expert level settings, communications means settings, intrusion level settings, and reactive/predictive settings.

24 Claims, 8 Drawing Sheets

METHODS, SYSTEMS, AND STORAGE MEDIUMS FOR OPTIMIZING A DEVICE

BACKGROUND OF INVENTION

The present invention relates generally to task-based assistance tools, and more particularly, to methods, systems, and storage mediums for optimizing a device. As the number of features and interfaces increase on devices, the level of sophistication of the device operators tends to decrease as each new advancement in technology typically translates to an abundance of new, and often complex, functions and utilities that need to be mastered. Consumers of these devices possess varying degrees of technical savvy ranging from novice to expert. Often, by the time a user comfortably learns each feature and function, the device becomes obsolete as new advancements are incorporated into newer versions. In the meantime, however, novice users often face difficulties in effectively using a device that, in turn, might not perform satisfactorily or may altogether fail. Existing help features that are provided to an operator tend to be boilerplate information and are not tailored to the needs and sophistication levels of these operators. Many of today's help tools provide too much or too little information about operating the device, may falsely assume that an operator has already acquired baseline knowledge about the device, or may inundate the operator with useless information that does not address the operator's interests or concerns.

What is needed, therefore, is a flexible assistance tool that provides an operator with the type and level of assistance desired by the operator, thereby eliminating confusion and maximizing the learning process.

SUMMARY OF INVENTION

Exemplary embodiments include methods, systems, and storage mediums for optimizing a device. The method includes detecting a suboptimal condition associated with the device and analyzing the suboptimal condition in light of selected operator preferences and device-related data. In response to the analysis, the method includes modifying a configuration of the device, the current state of said device, a current state of a networked device associated with said device, or a configuration of a networked device associated with said device. Alternatively, in response to the analyzing, the method includes notifying the operator of the suboptimal condition. The selected operator preferences include at least one of personality settings, expert level settings, communications means settings, intrusion level settings, and reactive/predictive settings.

A system for optimizing a device is also disclosed. The system includes a device including a user interface and a plurality of preference settings selectable by an operator of the device via the user interface. The plurality of preference settings include: personality setting selections, expertise level selections, communications setting selections, intrusion setting selections, and reactive/predictive setting selections. The system further includes a logic component, a control component operable for managing operation of the device, and a data storage component housing device-related data including at least one user preference selected by the operator. In response to detecting a suboptimal condition on the device, the logic component analyzes the suboptimal condition in light of the selected user preference(s) and the device-related data resulting in either a modification to the device operation or a notification to the operator.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF DRAWINGS

Referring now to the drawings wherein like elements are numbered alike in the several FIGURES.

DETAILED DESCRIPTION

The device optimizer leverages the computing power and storage capabilities for a variety of different devices. The device optimizer includes software logic that analyzes and assesses user activities, as well as the user's operating environment, and recommends, directs, and/or modifies device/service settings in order to help the user perform and operate the device or service in a manner optimized for the specific needs of the user.

Figure 1:
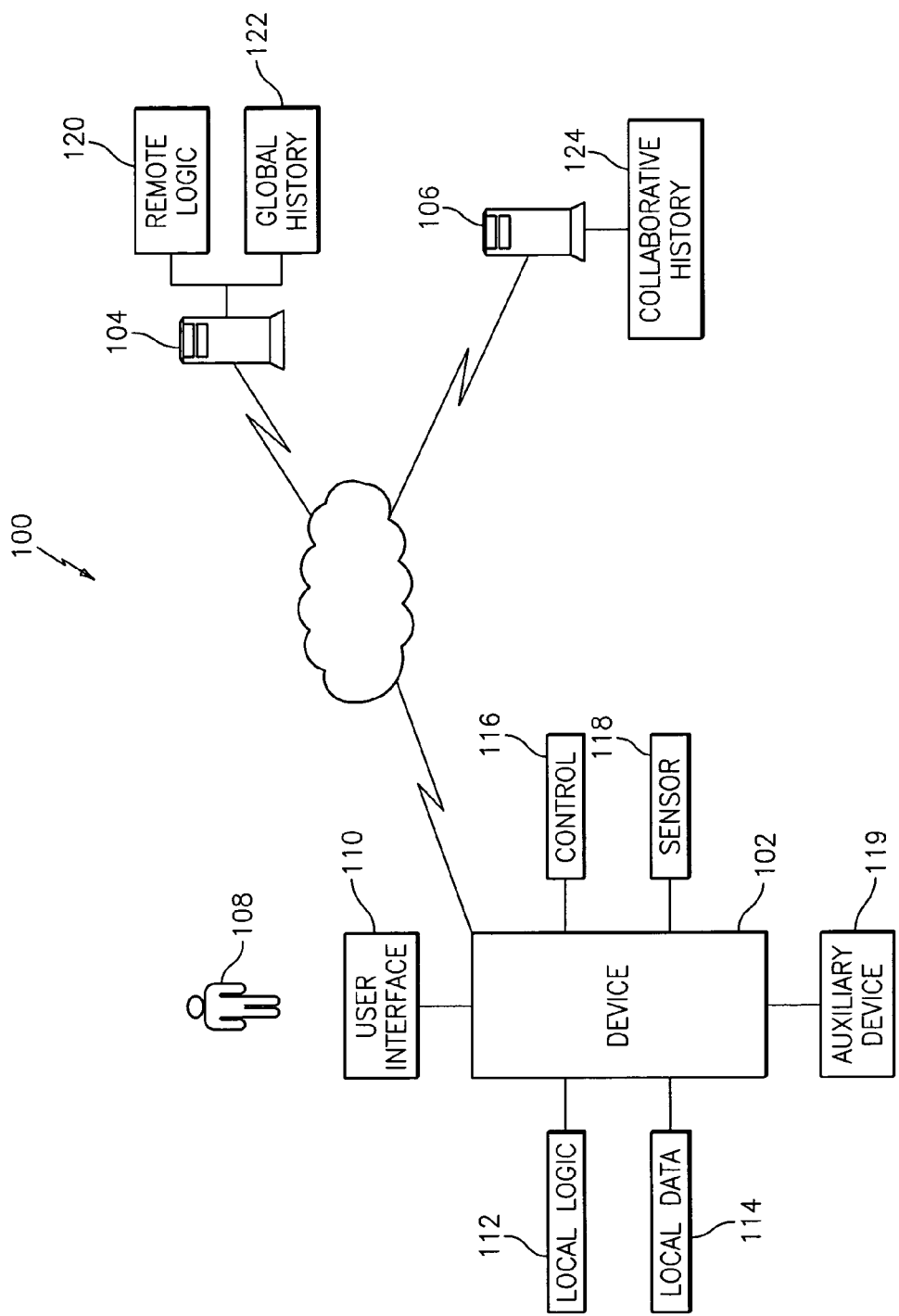
FIG. 1 is a block diagram of a system upon which the device optimizer may be implemented in exemplary embodiments.

Referring now to FIG. 1, a system 100 upon which the device optimizer may be implemented is described. System 100 includes a device 102, in communication with two servers 104 and 106 via a communications network. Communications network may comprise any suitable network system for transmitting voice, data, text, multi-media or other similar types of information. For illustrative purposes, the communications network is a global data network such as the Internet.

Device 102 refers to a product that includes operational features selectable by an operator 108 for performing one or more functions. Device 102 is computer-enhanced for receiving and executing instructions on behalf of operator 108. Examples of device 102 include a computer-enhanced consumer appliance with associated mechanical functioning capabilities such as a dishwasher, refrigerator, stove, washing machine, camera, etc., or may be a computer product such as a desktop, laptop, personal digital assistant, web-enabled cellular telephone, or other similar device. Device 102 may also comprise a commercial product such as manufacturing equipment, medical devices, or other business-related items.

Device 102 is associated with a user interface 110, local logic component 112, local data 114, control element 116, and sensor 118. While shown in FIG. 1 to be physical components that are separate from device 102, one or more of these elements 110-118 may be incorporated into device 102. Thus, the elements 110-118 as presented in FIG. 1 are shown as separate physical components for illustrative purposes only. If elements 110-118 are separate physical components, they may be configured to communicate with device 102 as needed. Further, device 102 is coupled to auxiliary device 119; however, it will be understood that auxiliary device 119 is not required in order to realize the advantages of the invention.

User interface 110 provides the means by which operator 108 interacts with device 102 and servers 104 and 106. User interface 110 is adaptable by the device optimizer according to the type of device being optimized for use in providing operational assistance and information to operator 108. A sample main menu screen for the device optimizer as presented to operator 108 via user interface 110 is shown in FIGS. 3-7. User interface 110 is utilized by operator 108 to initiate operation of device 102 as well as for receiving operational or technical assistance. Additionally, information presented by user interface 110 may be dynamically generated based upon user activity or inactivity. Thus, the elements shown in interface 110 may be self-organized in order to require as little user intervention as possible. The device optimizer may indicate this dynamic activity to operator 108 via interface 110 (e.g., user interface comments, "Your device is continuously being optimized.")

Local logic 112 refers to an analysis component of the device optimizer and may include predictive, comparative, pattern matching, inference, and deduction algorithms. Local logic 112 receives a variety of data resulting from operator activities, operator guidelines, user preference selections, and device status information, and applies business logic to the data for use in determining whether a suboptimal condition exists with respect to device 102 and/or device 119, as well as for determining the nature and extent of assistance that should be provided to the device operator. A suboptimal condition refers to any event or situation associated with a device that is determined to have a negative impact on the operation of a device, or is either: known to have a negative affect on the operation of the device; or, if no action is taken, is predicted to have a negative impact on the device performance in the future.

Local data 114 refers to a data storage element or database for device 102 and may house the guidelines for operating device 102, logs of past activities conducted by operator 108 on device 102, available and selected user preference selections, a current state or status of the device, environmental conditions, and other similar types of data. User preference selections include personality settings, level of expertise settings, communications settings, intrusion settings, and reactive/predictive settings. These are described further herein. Local database 114 further stores tables of business rules associated with these user preferences. The business rules provide the content of the communications presented to an operator based upon the user preference selections and history data. Additionally, local database 114 may store information acquired from external sources such as server 104 and/or server 106.

Control element 116 refers to a feature within device 102 that is responsible for executing operations requested by operator 108 (e.g., changing a channel, printing a page, etc.) as well as executing operations requested by the device optimizer (e.g., notifying an operator 108 of an error, correcting an error, changing the current state or configuration of the device 102, etc.).

Sensor 118 refers to a component that identifies and measures elements associated with operator 108, devices 102 and/or 119, or the immediate environment of the operator/devices, such as a physical sensor measuring ambient temperature, motion, light, sound, and speed, or may be a biosensor that measures human elements such as body temperature, facial expressions, heart rate, or similar items. Sensor 118 may also actively affect the look of interface 110. Also, interface 110 may react to being shouted at, as well as react to operator input by shouting. Interface 110 elements, such as a background screen may change color as problems or issues are detected. Further, the intensity of the background color may increase as additional issues are detected and not addressed or if the severity of existing issues worsen.

Auxiliary device 119 (also referred to herein as a networked device) refers to a device that is logically or physically connected to device 102 in a manner that provides a functional benefit to the device operator 108. Examples of such auxiliary devices may include a clothes dryer 119 that is operative with a washing machine 102, a VCR or DVD player 119 that is operative with a television set 102, a computer peripheral 119 that is connected to a computer device 102, etc.

Device 102 may communicate with server 104, which refers to an online information resource (e.g., manufacturer or retailer website) for device 102. For example, if device 102 is a television, server 104 may be operated by an entity that manufactures the brand of television to which device 102 belongs. Server 104 may be a mainframe computer or high-powered personal computer and includes web server software for communicating with device 102. Server 104 also includes remote logic 120 and global history database 122. Remote logic 120 handles functions similar to those described above with respect to local logic 112. Remote logic 120 performs these analyses for multiple devices related to the enterprise of server 104 and provides feedback to device 102 upon request. Global history database 122 stores past results of analyses performed by remote logic 120 and suggested solutions to operational or technical conditions and/or errors (i.e., suboptimal conditions). While shown in FIG. 1 to be separate from server 104, it will be understood by those skilled in the art that remote logic database 120 and global history database 122 may be stored directly within server 104 or may be stored in a physical data repository that is in communication with server 104 in order to realize the advantages of the invention. Likewise, collaborate history database 124 may be stored within server 106 or may be housed within a separate physical data repository that is in communication with server 106. Thus, the representations presented in FIG. 1 are shown for illustrative purposes and ease in explanation.

Device 102 may also communicate with server 106, which manages data regarding a variety of different devices produced by different manufacturers. Using the example above, device 102 may link to server 106 for information or assistance regarding auxiliary device 119 (e.g., a VCR) and how the two devices 102 and 119 interface. Server 106 may be a mainframe computer or high-powered personal computer and includes web server software for communicating with device 102. Server 106 further includes a collaborative history database 124. Collaborative history database 124 stores results of analyses performed by multiple device enterprises such as server 104 for a variety of different devices that share relationships such as a television manufactured by a first enterprise and a VCR manufactured by a second enterprise. Collaborative history database 124 stores corrective solutions to errors that have been detected when two devices (e.g., device 102 and auxiliary device 119) are coupled together and where one of the devices may impact the performance or operation of another device.

Figure 2A:
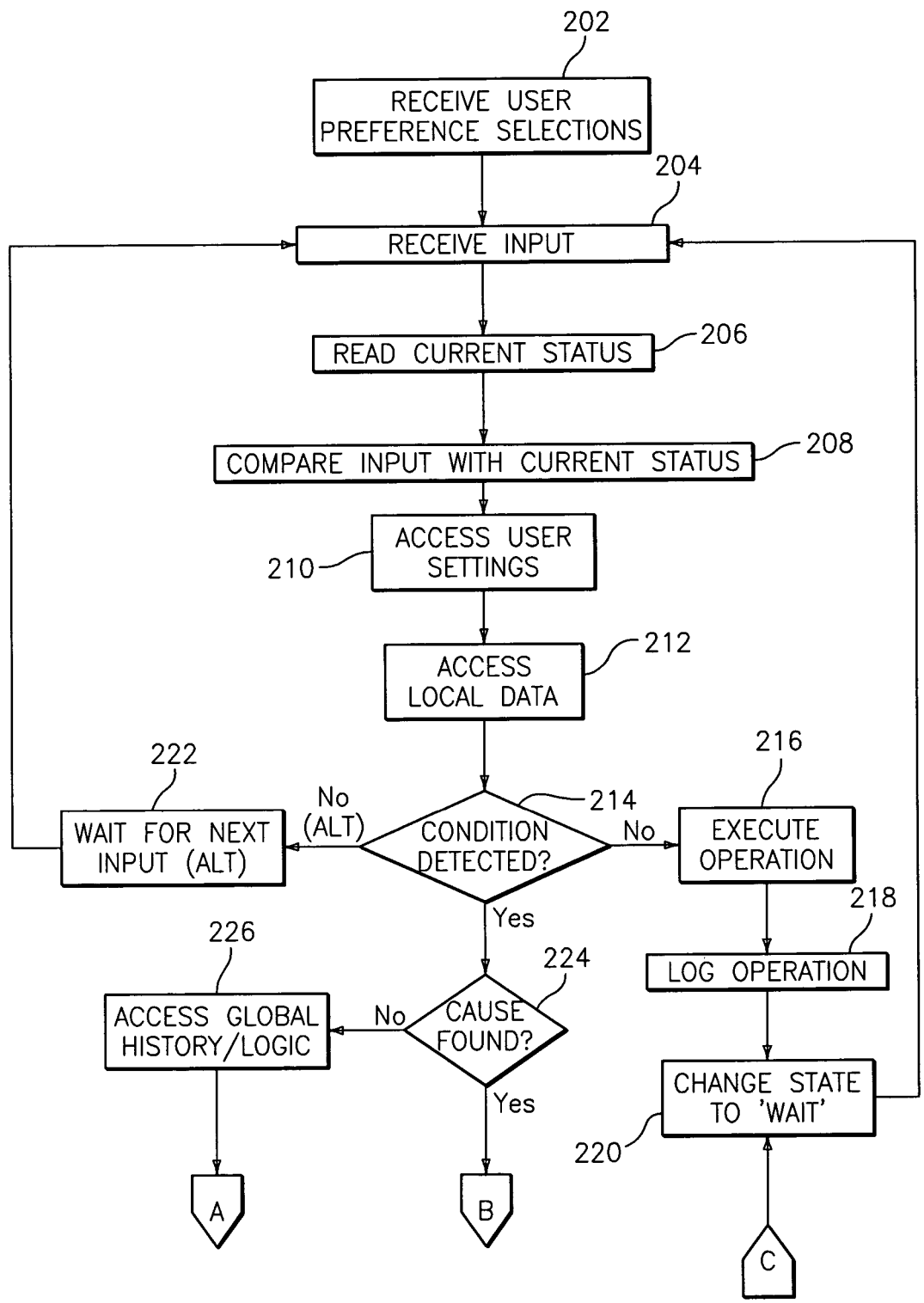
FIGS. 2A and 2B represent a flowchart describing a process for implementing the device optimizer in exemplary embodiments.

Referring now to FIG. 2A, implementation of the device optimizer will now be described. At step 202 user preference selections are received from operator 108 via user interface 110. User preference selections define the nature and extent of communications that will transpire between operator 108 and the device optimizer with respect to operational conditions related to the device 102. As shown in sample main menu screen 300 of FIG. 3, operator 108 is queried to select from preferences including personality settings 302, level of expertise 304, communications settings 306, intrusion settings 308, and reactive/predictive settings 310. Alternate embodiments include providing a default setting (not shown) for an operator 108 who does not desire to make a selection of one or more of preferences 302-310. In this instance, the device optimizer follows a pre-defined set of preference settings and business rules.

Figure 3:
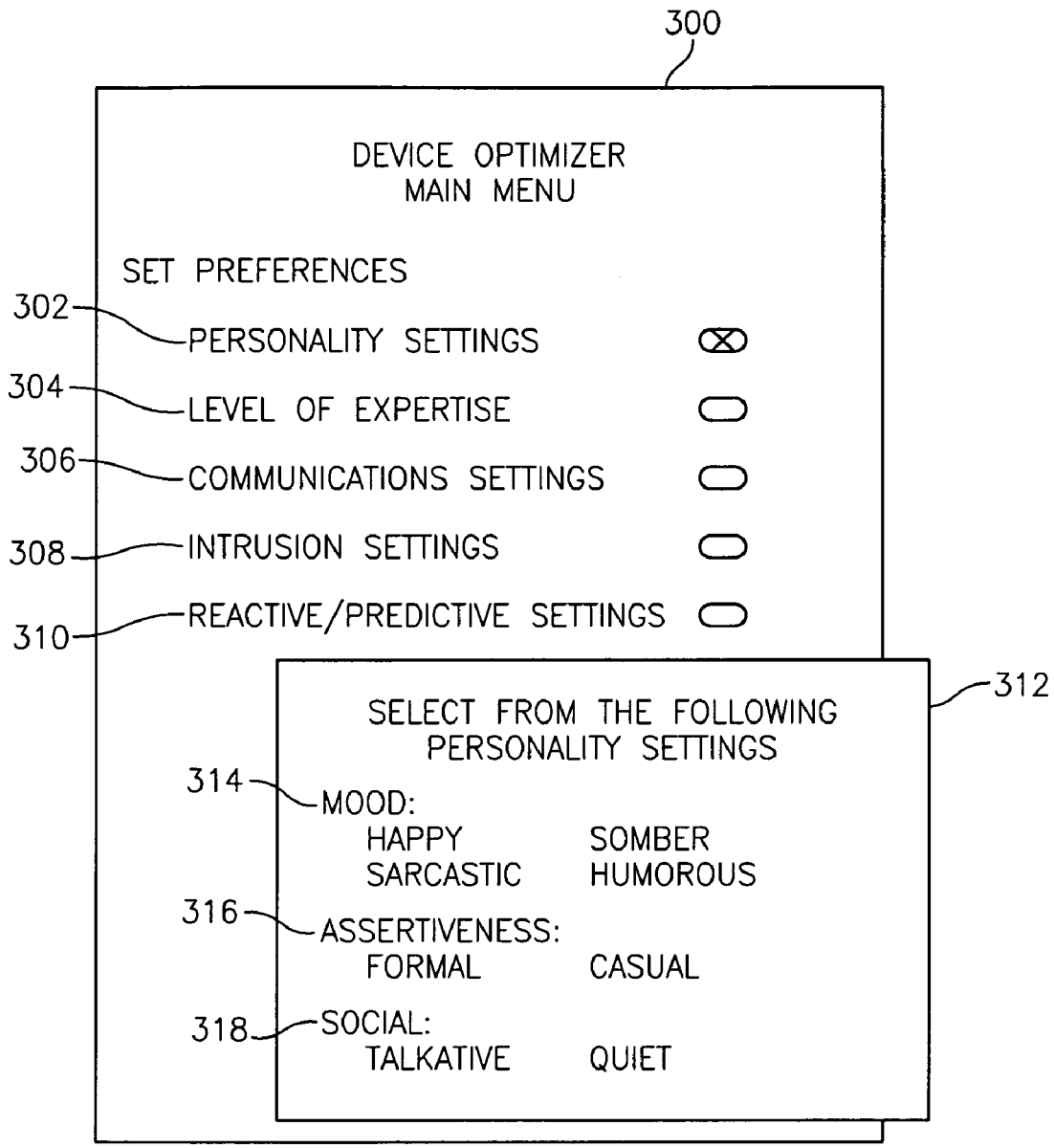
FIG. 3 illustrates a sample main menu of a user interface for the device optimizer used to select personality settings from a list of user preference selections in exemplary embodiments.

As shown in FIG. 3, operator 108 has selected personality settings 302. A subwindow 312 appears that lists personality choices such as mood 314, assertiveness 316, and social 318. Operator 108 may select one choice from each personality category. For example, if operator 108 selects 'humorous' from personality choice 314, the information and assistance provided by the device optimizer will be tailored to this preference. Accordingly, communications transpiring between the device optimizer and operator 108 will be tailored to the mood and personality of the operator 108, facilitating meaningful dialogue and comprehension capabilities in line with the unique personality of each operator 108. In addition to selecting a mood, operator 108 may also select an assertiveness level 316 from personality settings 302. This assertiveness option provides a choice of language or communication styles and enables operator 108 to receive information and assistance from the device optimizer in a formal manner or casual manner as desired by the operator 108. For example, a teenaged operator 108 may prefer a casual communication style, while a college professor 108 may opt for a formal communication style.

Further, operator 108 may select a social selection 318 that drives the device optimizer either to communicate often and extensively with operator 108 when providing information and assistance or to remain quiet.

Figure 4:
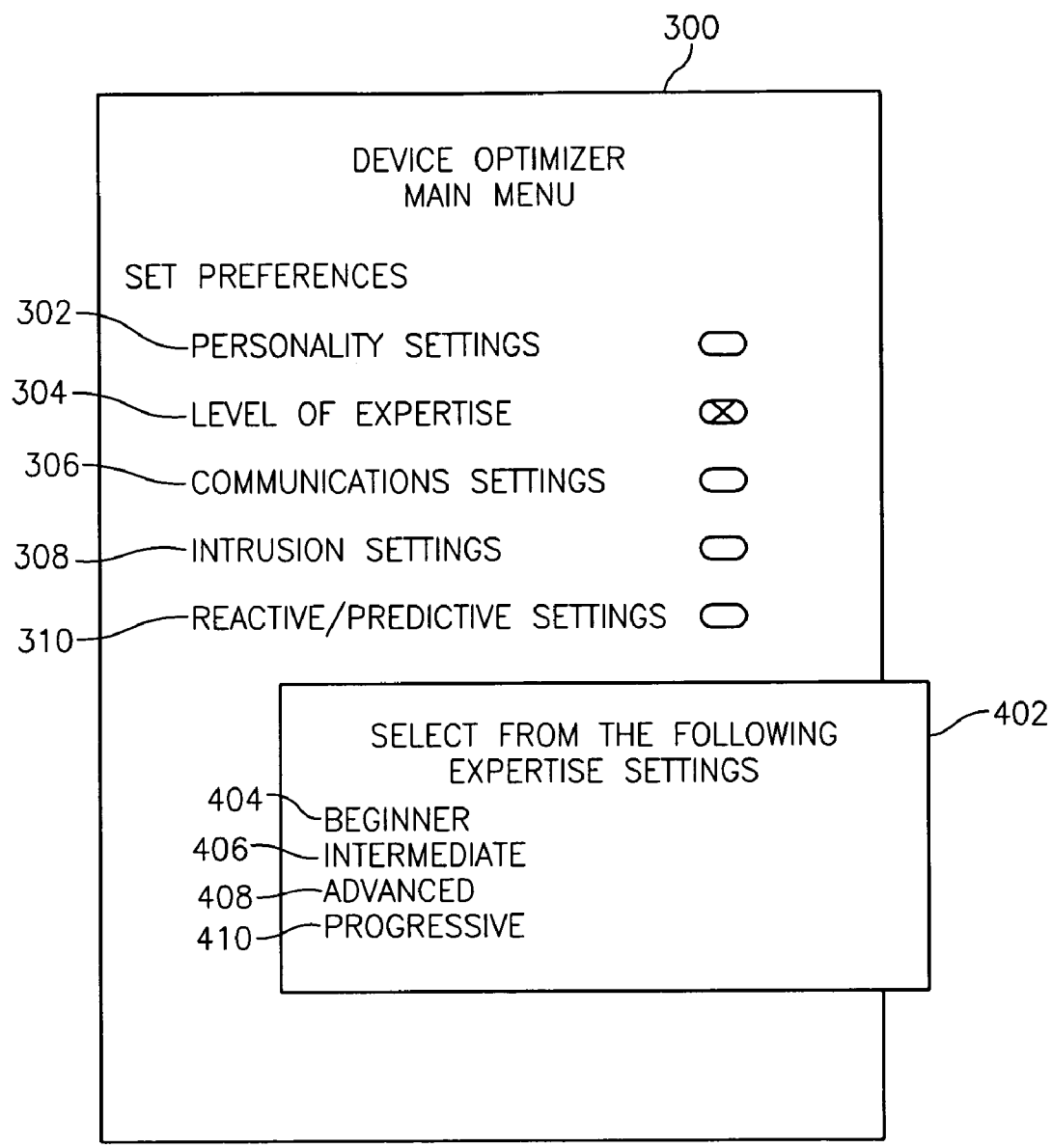
FIG. 4 illustrates a sample main menu of a user interface for the device optimizer used to select expertise settings from a list of user preference selections in exemplary embodiments.

If operator 108 selects level of expertise option 304, this selection will be utilized by the device optimizer in communicating with operator 108. Subwindow 402 of FIG. 4 illustrates the various options available to operator 108. Operator expertise levels may be selected such as beginner 404, intermediate 406, advanced 408, or progressive 410. For example, if operator 108 selects beginner 404, then the device optimizer will communicate with the operator 108 using common language and layman's terms and may perhaps provide options for receiving additional information on a topic to aid in the operator's learning. Thus, expertise option 304 is directed to the level of technology with which an operator 108 is familiar. This differs from the assertiveness option 316, which is not directed to the substance of the communication, but rather the style of communication.

If progressive option 410 is selected, the device optimizer provides a level of assistance and information that diminishes over time in accordance with the operator's nature and rate of advancement in his/her capabilities. The device optimizer utilizes the operator's past activities and observed progress to determine the operator's current level of expertise. This analysis may be performed by applying one or more logic algorithms provided by local logic 112 to the selected user preferences 302-310 and operational history from local data 114. This assessment is performed continuously over time in order to adapt to the operator's changing needs and acquired knowledge. If progressive function 410 is selected, the operator 108 is queried to select an initial expertise level (e.g., one of 404-408) from which the optimizer will utilize as a baseline for initial communications and assistance.

Figure 5:
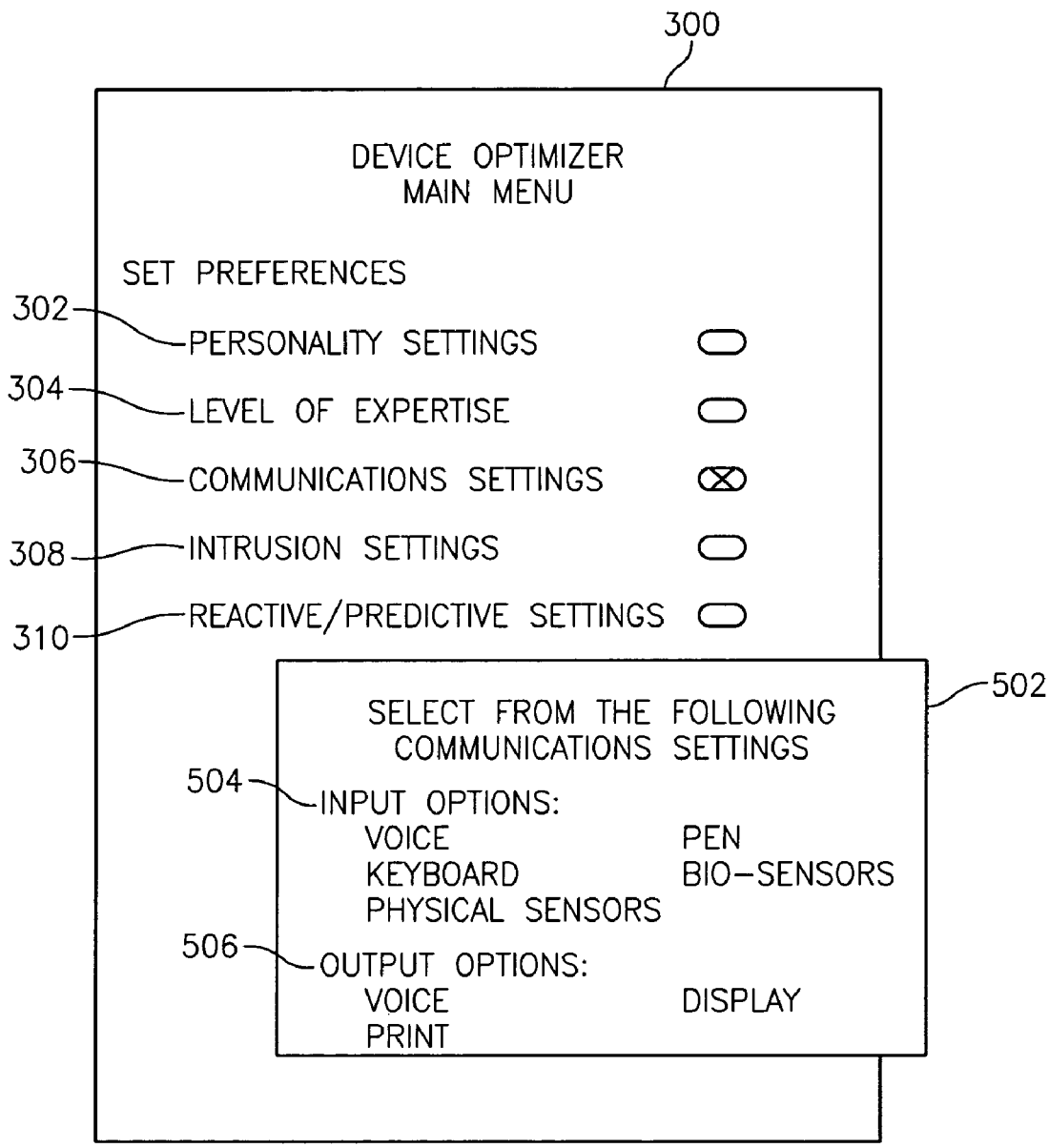
FIG. 5 illustrates a sample main menu of a user interface for the device optimizer used to select communications means settings from a list of user preference selections in exemplary embodiments.

Another preference selectable by operator 108 is communications settings option 306. A sample subwindow 502 is shown in FIG. 5 illustrating the options provided for communications settings selection 306. Communications settings 306 determine the operator's preferences for communicating with the device optimizer. Operator 108 may select from a list of input/output options, 504 and 506, respectively, if applicable to the device 102. Input/output options 504 and 506 may include voice, keyboard, physical sensors, pen, print, and biosensors. If device 102 is voice-enabled, for example, the operator 108 may select this option for communicating with the device optimizer. Physical sensors may include temperature sensors, speed sensors, light sensors, motions sensors, sound sensors, or other means of measuring an element. Output options 506 determine the means by which operator 108 desires the device optimizer to communicate with operator 108.

Figure 6:
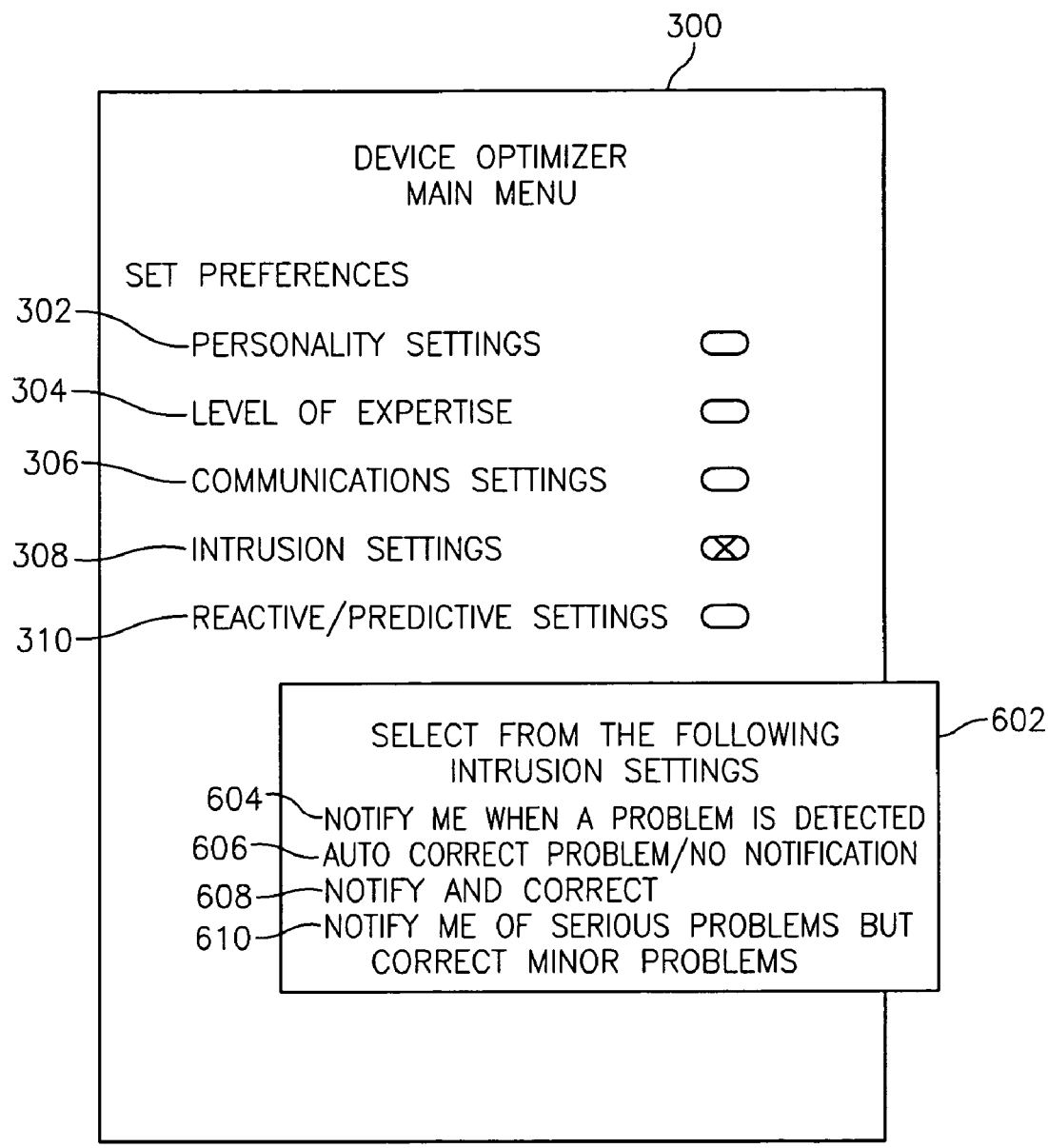
FIG. 6 illustrates a sample main menu of a user interface for the device optimizer used to select intrusion settings from a list of user preference selections in exemplary embodiments.

Intrusion settings 308 enable operator 108 to determine the nature and extent of intrusion desired regarding the communications provided by the device optimizer. If this setting 308 is selected, a subwindow 602 as shown in FIG. 6 provides various options. For example, operator 108 may wish to be informed by the device optimizer each time a suboptimal condition (e.g., an error or issue) is detected regardless of the type and nature of the condition using option 604. Alternatively, operator 108 may desire that the device optimizer automatically correct any suboptimal condition detected without issuing any notification using option 606. The operator 108 may wish to have the suboptimal condition automatically corrected and receive notification that a problem occurred and a correction made using option 608. Otherwise, operator 108 may wish to receive notification of serious problems and have minor problems automatically corrected using option 610. Other options may be provided to the operator 108 and are contemplated by the device optimizer.

Figure 7:
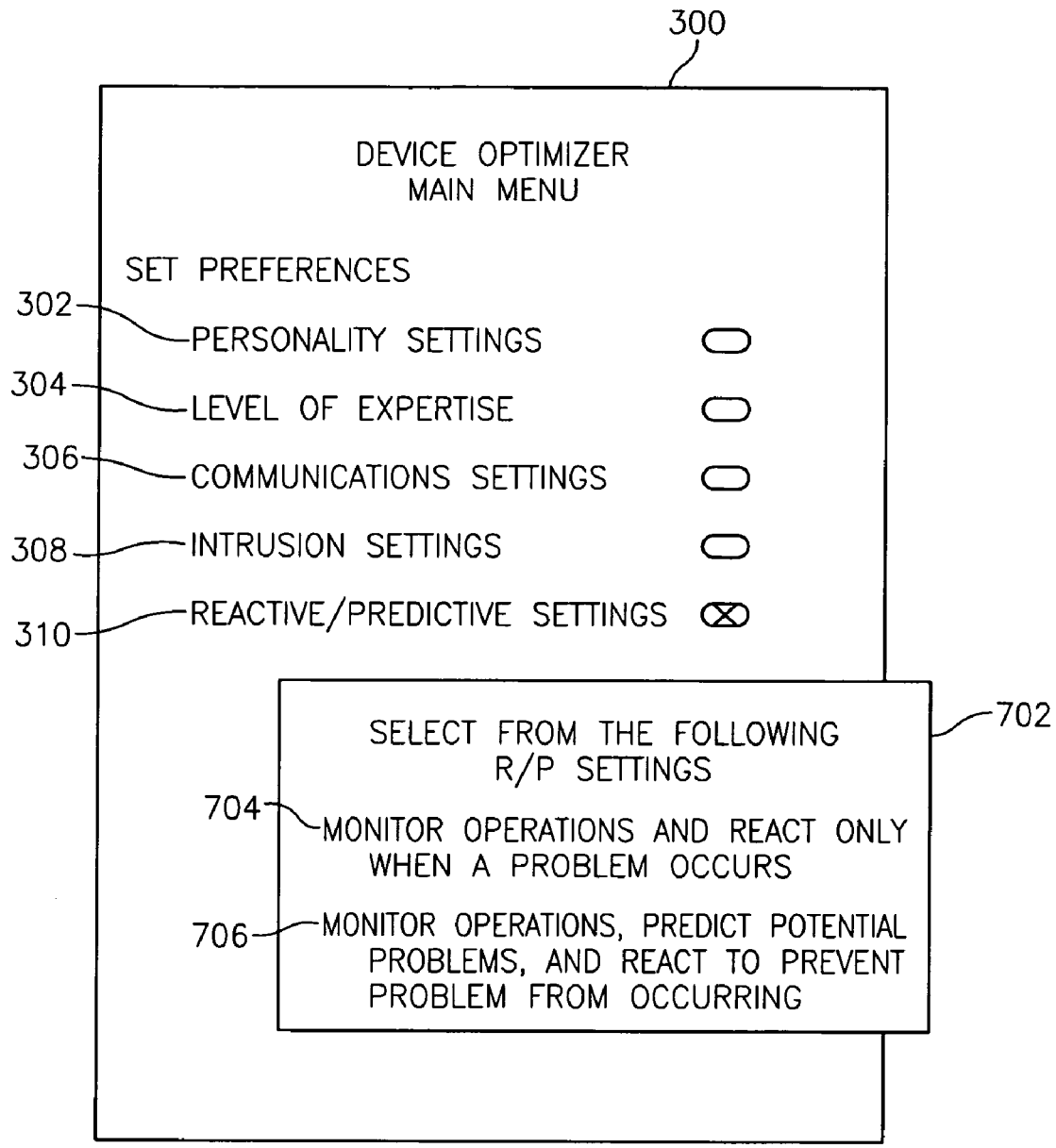
FIG. 7 illustrates a sample main menu of a user interface for the device optimizer used to select reactive/predictive settings from a list of user preference selections in exemplary embodiments.

Another user preference includes reactive/predictive setting 310. If selected, a subwindow 702 appears as shown in FIG. 7. The reactive/predictive setting 310 enables operator 108 to manage the control of how issues or potential problems relating to operation of the device are handled. For example, operator 108 may want the device optimizer to react only upon detection of a problem using option 704. Alternatively, operator 108 may wish that the operations and activities conducted on device 102 (and optionally auxiliary device 119) be monitored for symptoms of potential or future problems and take preventative actions when such symptoms are detected. These user preferences are stored in one or more of local databases 114, global history database 122, and collaborative history database 124.

Implementation of the device optimizer continues in FIG. 2A where device 102 receives an input from operator 108 or an input resulting from an activity occurring in the operator's immediate environment at step 204. This input may be made by keyboard, pen, voice, stylus, etc., or may be a sensor-generated input such as a temperature reading, a motion detected, or type of measurement received by sensor 118. Local logic 112 reads the current status of device 102 at step 206 and compares the input received to the current status at step 208. The device optimizer then accesses the user settings selected from preferences 302-310 stored in local database 114 at step 210 and accesses operational data stored in local database 114 at step 212. Local logic 112 determines whether a suboptimal condition exists or, alternatively, whether operator 108 requires assistance at step 214 using the current status, the input received, the user settings, and operational data.

If no suboptimal condition exists or no assistance is believed to be required at step 214, the device optimizer sends a signal to control element 116 to execute an operation in accordance with the nature of input received at step 216. The operation is logged in local database 114 at step 218. The current device status is changed to 'wait' at step 220 indicating that the device 102 is ready to accept another input, and the process returns to step 204 once another input is received.

In alternate embodiments, if no assistance is believed to be required, the device optimizer may wait a limited period of time for a second input under specified conditions at step 222. For example, it may be that the user preferences of operator 108 indicate that the social setting 318 be set to 'quiet' and/or the level of intrusion option 308 indicates that the operator 108 does not wish to be notified, or that the level of expertise setting 304 is set to advanced, each of which indicating that the operator 108 may have made an error in input but the operation is simple enough that the operator 108 can unilaterally correct it. In this instance, the device optimizer may wait for a second input at step 222 and return to step 204 when the next input is received.

If, on the other hand, a suboptimal condition has been detected or it is believed that operator assistance may be required at step 214, the device optimizer determines if a cause of the condition or error has been found at step 224 using local logic 112 and information acquired in steps 202-212. If a cause is known at step 224, the process continues to FIG. 2B. Otherwise, the device optimizer contacts server 104 for further information at step 226 and the process continues in FIG. 2B.

Figure 2B:
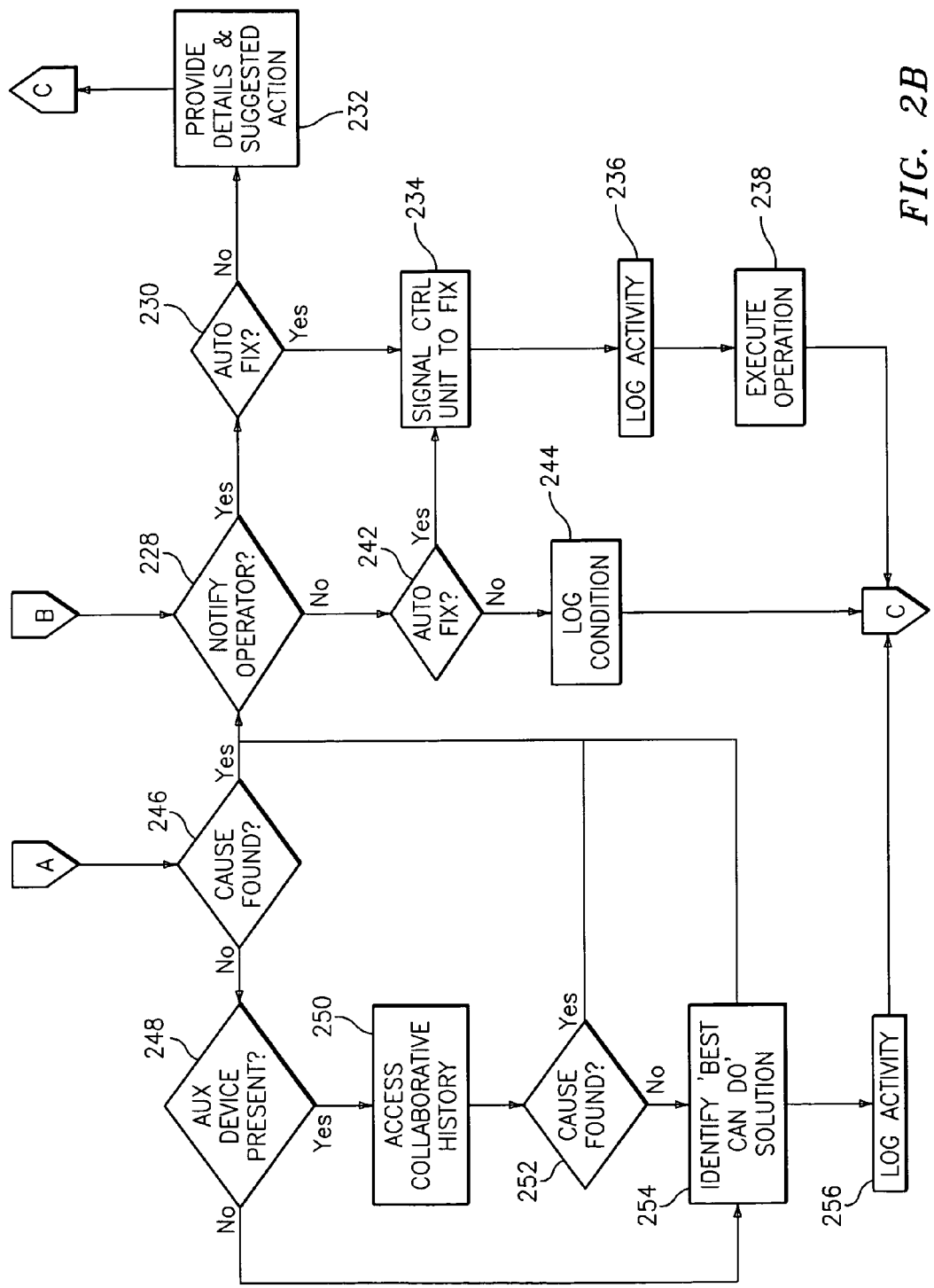

If a cause has been found at step 224, the process continues at step 228 of FIG. 2B whereby the device optimizer determines whether a notification of the condition or problem should be transmitted to the operator 108. This determination is made in accordance with the user preferences (e.g., intrusion setting 308) and the nature of the condition or error identified. If it is determined that the operator 108 is to be notified at step 228, the device optimizer determines whether to automatically modify the condition or correct the problem at step 230 using the operator's intrusion setting selections 308. If the device optimizer determines that the condition or problem should not be automatically modified or corrected, a notification to the operator 108 is transmitted along with details and suggested courses of action at step 232. The process then reverts to step 220 of FIG. 2A whereby the current status of device 102 is changed to 'wait'.

If the device optimizer determines that the condition or problem should be automatically modified or corrected at step 230, control element 116 is signaled to perform the modification/correction at step 234. The modification/correction is logged in local database 114 at step 236, and the desired operation requested from the operator is executed at step 238. Control element 116 is signaled to change the current status of device 102 to 'wait' at step 220.

Referring back to step 228, if it is determined that operator 108 should not be notified, the device optimizer determines whether to automatically modify the condition or correct the error at step 242. If so, the process continues at step 234 as described above. Otherwise, the condition or error is logged into local database 114 at step 244 and control element 116 is signaled to change the current status of device 102 to 'wait' at step 220.

Referring back to step 226, it is determined whether a cause of the condition or error is found in global history database 122 at step 246. If not, then it is determined whether an auxiliary device 119 is present at step 248. If so, the device optimizer accesses global history database 122 at step 250 to look for a potential cause of the condition or error. If a cause is not found at step 252, the device optimizer identifies a 'best-can-do' modification to the condition or solution to the error at step 254. It is next determined whether this modification/solution should be sent to the operator 108 at step 228 based upon the selected user preferences. The process continues as described above.

The modification/solution is also logged into collaborative history database 124 at step 256, and control element 116 is signaled to change the current status of device 102 to 'wait' at step 220.

Referring back to step 252, if a cause is found in collaborative history database 124, then the process returns to step 228 as described above.

Referring back to step 248, if no auxiliary device 119 is detected, the device optimizer identifies a 'best-can-do' modification/solution as described in step 254, the modification/solution is logged in global history database 122 at step 256, the device status is changed to 'wait' at step 220, and the process continues as described above in step 228.

Referring back to step 246, if a cause is found in global history database 122, then the process continues in step 228 as described above.

As can be seen from the above, the device optimizer leverages the computing power and storage capabilities for a variety of different devices. The device optimizer includes software logic that analyzes and assesses user activities, as well as the operating environment, and recommends, directs, and/or modifies settings in order to help the user perform and operate the device or service in a manner optimized for the specific needs of the user.

As described above, the present invention can be embodied in the form of computer-implemented processes and apparatuses for practicing those processes. The present invention can also be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method for optimizing operation of a device, comprising:
   detecting a suboptimal condition associated with said device;
   analyzing said suboptimal condition in light of selected operator preferences and device-related data;
   in response to said analyzing, performing at least one of:
      modifying at least one of:
         configuration of said device;
         current state of said device;
         a current state of a networked device associated with said device; and
         a configuration of a networked device associated with said device; and
      notifying said operator of said suboptimal condition;
         wherein said selected operator preferences include intrusion level settings; personality settings; expert level settings; communications means settings; and reactive/predictive settings;
   wherein said intrusion level settings comprise an operator-defined level of intrusion used by said device for communicating with said operator in the event of said suboptimal condition, said intrusion level settings comprising:
   resolving said suboptimal condition without notifying said operator;
   resolving a select type of suboptimal condition without notifying said operator;
   notifying said operator when any suboptimal condition is detected;
   notifying said operator when a select type of suboptimal condition is detected; and
   providing no notification and no resolution to said suboptimal condition.

2. The method of claim 1, wherein said device-related data include at least one of:
   operating guidelines for said device;
   technical specifications associated with said device;
   logs of past activities conducted;
   a current state of said device; and
   an environmental state associated with said device.

3. The method of claim 2, wherein said device-related data is received from a database that is local to said device.

4. The method of claim 2, wherein said device-related data is received from a remote database; wherein further said device-related data includes logs of activities conducted by operators of devices that originate from a common business enterprise.

5. The method of claim 1, wherein said device-related data is received from a remote collaborative database; wherein further said device-related data includes:
   logs of activities conducted by operators of auxiliary devices that originate from a plurality of business enterprises, said device in communication with at least one of said auxiliary devices; and
   information on how to operate said auxiliary devices.

6. The method of claim 1, wherein said detecting a suboptimal condition associated with said device occurs in response to receiving an input from an operator of said device, said input including at least one of:
   an option on said device selected by said operator operable for executing an operation said device; and
   sensor-generated data.

7. The method of claim 6, wherein said option is activated by at least one of: keyboard stroke; voice; button; and switch.

8. The method of claim 6, wherein said sensor-generated data comprises at least one of: motion; facial expression; light; sound; temperature; and speed.

9. The method of claim 1, wherein said notifying said operator of said suboptimal condition occurs via at least one of: voice; text; and visual display.

10. The method of claim 1, wherein said selected operator preferences include said personality settings, said personality settings comprise an operator-defined mood used by said device for communicating with said operator, said personality settings including at least one of: happy; sarcastic; somber; and humorous.

11. The method of claim 1, wherein said selected operator preferences include said expert level settings, said expert level settings comprise an operator-defined level of terminology used by said device for communicating with said operator, said expert level settings comprising at least one of: beginner; intermediate; and advanced.

12. The method of claim 11, further comprising a progressive setting operable for advancing a expert level setting over time based upon an operator's growth in knowledge of using said device; wherein progression of said expert level setting applied to said operator is determined by continuously applying business logic to said operator's logs of past activities conducted on said device and determining an expert level setting that is commensurate with said operator's rate of growth in using said device.

13. The method of claim 1, wherein said selected operator preferences include said reactive/predictive level settings, said reactive/predictive level settings comprise an operator-defined level of reactive/predictive actions taken by said device on behalf of said operator, said reactive/predictive settings comprising at least one of:
   resolve suboptimal conditions upon detection; and
   monitor activities conducted on said device, and predict future conflicts before said future conflicts occur.

14. A storage medium encoded with machine-readable computer program code for optimizing a device, said storage medium including instructions for causing said device to implement a method, comprising:
   detecting a suboptimal condition associated with said device;
   analyzing said suboptimal condition in light of selected operator preferences and device-related data;
   in response to said analyzing, performing at least one of:
      modifying at least one of:
         configuration of said device;
         current state of said device;
         a current state of a networked device associated with said device; and
         a configuration of a networked device associated with said device; and
      notifying said operator of said suboptimal condition;
         wherein said selected operator preferences include intrusion level settings; personality settings; expert level settings; communications means settings; and reactive/predictive settings;
   wherein said intrusion level settings comprise an operator-defined level of intrusion used by said device for communicating with said operator in the event of said suboptimal condition, said intrusion level settings comprising:

resolving said suboptimal condition without notifying said operator;
resolving a select type of suboptimal condition without notifying said operator;
notifying said operator when any suboptimal condition is detected;
notifying said operator when a select type of suboptimal condition is detected; and
providing no notification and no resolution to said suboptimal condition.

15. A system for optimizing a device, comprising:
a device comprising:
  a user interface;
  a plurality of preference settings selectable by an operator of said device via said user interface, said plurality of preference settings including:
    personality setting selections;
    expertise level selections;
    communications setting selections;
    intrusion setting selections; and
    reactive/predictive setting selections;
  a logic component;
  a control component operable for managing operation of said device; and
  a data storage component housing device-related data including at least one user preference selected by said operator;
    wherein in response to detecting a suboptimal condition on said device, said logic component analyzes said suboptimal condition in light of said at least one selected user preference and said device-related data resulting in at least one of:
      a modification to said device operation; and
      a notification to said operator;
  wherein said intrusion level settings comprise an operator-defined level of intrusion used by said device for communicating with said operator in the event of said suboptimal condition, said intrusion level settings comprising:
    resolving said suboptimal condition without notifying said operator;
    resolving a select type of suboptimal condition without notifying said operator;
    notifying said operator when any suboptimal condition is detected;
    notifying said operator when a select type of suboptimal condition is detected; and
    providing no notification and no resolution to said suboptimal condition.

16. The system of claim 15, wherein said device-related data includes:
operating guidelines for said device;
  technical specifications associated with said device;
  logs of past activities conducted;
  a current state of said device; and
  an environmental state associated with said device.

17. The system of claim 15, further comprising:
a link to a remote database over a network, said remote database storing logs of activities conducted by operators of devices that originate from a common business enterprise; wherein analyzing said suboptimal condition in light of said at least one selected user preference and said device-related data includes analyzing said suboptimal condition in light of said logs of activities conducted by operators of devices that originate from said common business enterprise.

18. The system of claim 15, further comprising:
a link to a remote collaborative database, said remote collaborative database storing:
  logs of activities conducted by operators of auxiliary devices that originate from a plurality of business enterprises; wherein said device in communication with at least one of said auxiliary devices; and
  information on how to operate said auxiliary devices;
    wherein analyzing said suboptimal condition in light of said at least one selected user preference and said device-related data includes analyzing said suboptimal condition in light of said logs of activities conducted by operators of auxiliary devices that originate from a plurality of business enterprises.

19. The system of claim 15, wherein said suboptimal condition occurs in response to receiving an input from an operator of said device, said input including at least one of:
an option on said device selected by said operator operable for executing an operation said device; and
sensor-generated data.

20. The system of claim 19, wherein said sensor-generated data comprises at least one of: motion; facial expression; light; sound; temperature; and speed.

21. The system of claim 15, wherein said personality settings comprise an operator-defined mood used by said device for communicating with said operator, said personality settings including at least one of: happy; sarcastic; somber; and humorous.

22. The system of claim 15, wherein said expert level settings comprise an operator-defined level of terminology used by said device for communicating with said operator, said expert level settings comprising at least one of: beginner; intermediate; and advanced.

23. The system of claim 22, further comprising a progressive setting operable for advancing a expert level setting over time based upon an operator's growth in knowledge of using said device; wherein progression of said expert level setting applied to said operator is determined by continuously applying business logic to said operator's logs of past activities conducted on said device and determining an expert level setting that is commensurate with said operator's rate of growth in using said device.

24. The system of claim 15, wherein said reactive/predictive level settings comprise an operator-defined level of reactive/predictive actions taken by said device on behalf of said operator, said reactive/predictive settings comprising at least one of:
resolve suboptimal conditions upon detection; and
monitor activities conducted on said device, and predict future conflicts before said future conflicts occur.

* * * * *